United States Patent Office 2,873,078
Patented Feb. 10, 1959

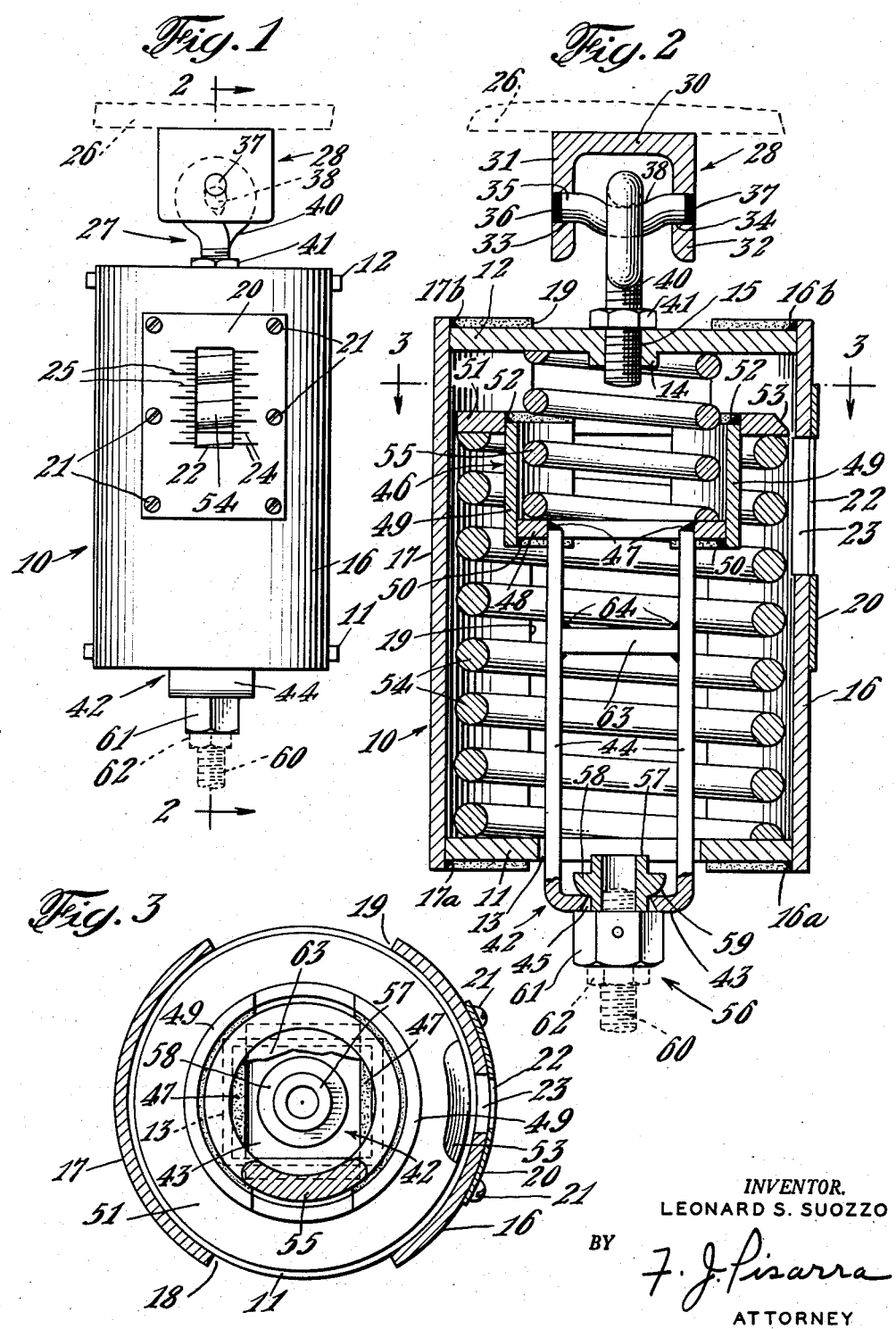

2,873,078

COMBINED SPRING HANGER AND SHOCK ABSORBER

Leonard S. Suozzo, Hackensack, N. J., assignor to Bergen Pipesupport Corp., New York, N. Y., a corporation of New York Application May 3, 1955, Serial No. 505,688

1 Claim. (Cl. 248—54)

This invention relates to a device for yieldingly supporting pipes and similar loads that are subject to movement and for absorbing shock forces developed in the pipes during use.

The device of this invention has wide application and may be advantageously employed to support various types of piping systems that carry steam or other fluids at high temperatures and pressures. One field in which the device is particularly useful is that of marine piping systems where the piping develops vertical shock forces, that may act upwardly or downwardly, and lateral shock forces due to vibrations created in the piping in the course of use.

It has frequently been the practice heretofore to provide marine piping systems with a conventional spring hanger that is disposed vertically to carry the load and a pair of sway braces to absorb certain of the shock forces created in the piping. These sway braces are generally arranged to opposite sides of the hanger and at corresponding 45° angles to the horizontal. My device is used in lieu of a conventional spring hanger and eliminates the need for one of the sway braces with resulting reductions in cost and weight of parts and savings in valuable space. In other words, marine piping systems may be adequately supported and protected against various shock loads that are normally encountered by employing my device and a single sway brace which is preferably arranged horizontally.

My device is provided with a lower spring and an upper spring and its parts are so constructed and arranged that the lower spring not only carries the pipe load but also absorbs downward shock forces while the upper spring absorbs upward shock forces. Further, the springs are so disposed and related in size that, when an upward shock force is created, the upper spring becomes effective to absorb such force before the lower spring becomes completely unloaded, thereby dampening the force and permitting the piping to assume its proper position without damage or undue stress to any of the elements involved.

It is the primary object of the invention to provide a resilient support device for piping or the like, which device has improved features of construction and design.

Another object of the invention is to provide a combined spring hanger and shock absorber including a housing having at least one window which permits of ready inspection of parts within the housing and convenient removal of dust or other foreign particles that may become deposited in the housing during use.

Another object of the invention is to provide a device of the character indicated having its parts compactly arranged whereby it may be installed and used in locations where vertical space is restricted.

A further object of the invention is to provide a combined spring hanger and shock absorber that is simple in design, that is lightweight and sturdy in construction, that is reasonable in manufacturing costs and that is adapted to be readily assembled and installed.

It is a still further object of the invention to provide a combined spring hanger and shock absorber that is capable of performing its intended functions in a dependable and entirely satisfactory manner.

To the end that the foregoing objects may be attained, a combined spring hanger and shock absorber constructed in accordance with the invention preferably comprises a housing having top, bottom and side walls. The housing has a window permitting inspection of and ready access to parts positioned therein. Among such parts is a device comprising a U-shaped member that registers with an aperture in the bottom wall and that includes a web and a pair of arms. The U-shaped member and the parts of the bottom wall defining the aperture are so configured as to permit vertical movement of the member through the aperture but prevent rotational movement of the member relative to the housing. A spring support cage is attached to the ends of the arms remote from the web. A spring plate is secured to the cage and projects laterally therebeyond. Within the housing are coaxial first and second helical compression springs. The first spring bears against the plate and the housing bottom wall and normally and yieldingly urges the device upwardly relative to the housing. The second spring is adapted to yieldingly bias the device downwardly relative to the housing against the action of the first spring upon predetermined upward movement of the device. The first spring is stronger than the second spring and is adapted to support the piping load and absorb downward shock forces. The second spring absorbs upward shock forces and is placed in active service before the lower spring becomes completely unloaded as will be apparent from the drawing and the detailed description that follows.

The enumerated objects and other objects, together with advantages of the invention, will be understood by persons skilled in the art upon reference to the following detailed description, taken in conjunction with the annexed drawing, which respectively describe and illustrate a preferred arrangement of parts embodying the invention.

In the drawing:

Fig. 1 is a view in elevation of a combined spring hanger and shock absorber constructed in accordance with the invention;

Fig. 2 is a view in enlargement taken along line 2—2 of Fig. 1; and

Fig. 3 is a view taken along line 3—3 of Fig. 2.

Referring now to the drawing wherein like reference numerals denote corresponding parts throughout the several views, a housing, generally indicated by numeral 10, includes circular and parallel bottom and top walls 11 and 12, respectively. The bottom wall has an oblong central aperture 13. The top wall has an integral depending boss 14 and is provided with a tapped through opening 15. The housing also includes a pair of spaced-apart vertical side walls 16 and 17. Side wall 16 is welded to the bottom and top walls and indicated at 16a and 16b respectively, while side wall 17 is similarly welded to the top and bottom walls as indicated at 17a and 17b. As is best shown in Fig. 3, the side walls are arcuate in transverse cross section. The walls of the housing are so formed and arranged as to define a pair of windows 18 and 19 that extend the full effective height of the housing. These windows are of substantial width thereby permitting ready access to the interior of the housing.

An indicator plate 20 is mounted against the outer surface of side wall 16 by a plurality of screws 21. This plate has a vertical slot 22 which is aligned with a like slot 23 in wall 16. The plate is provided with a first scale having graduations 24, for indicating the weight of the load carried by the hanger and a second scale having graduations 25 for indicating the distance traveled by the load.

The housing is adapted to be suspended from a structural beam 26, or other form of support, by a connector or coupling means 27 which will now be described. This coupling means comprises an inverted U-shaped bracket 28 consisting of a web 30 and a pair of spaced parallel arms 31 and 32 that are provided with corresponding openings 33 and 34. The bracket is secured to beam 26 in any desired manner known to the art, preferably by welding. A cyclindrical cross rod 35 has its ends disposed in openings 33 and 34 and is maintained in the illustrated position by welds 36 and 37. Rod 35 is bent intermediate its ends to form a saddle 38. An eye bolt 40 engages tapped opening 15 in the housing top wall and carries a locking nut 41. The eye bolt is connected to cross rod 35 and rides in saddle 38 thereby permitting of rocking movement of the housing relative to bracket 28 and beam 26.

A U-shaped member 42 is positioned within the housing and registers with aperture 13 in the housing bottom wall. Member 42 consists of a web 43 and a pair of elongated parallel arms 44. The web has a central through opening 45. The U-shaped member and the parts of the housing bottom wall which define aperture 13 are so configured as to permit vertical movement of the member through the aperture but prevent rotational movement of the member relative to the housing.

A spring support cage, generally identified by numeral 46, is affixed to the upper ends of arms 44 by welds 47. The cage includes a ring base 48 and a pair of spaced-apart arcuate side walls 49 that are welded together as indicated at 50. A spring plate 51, that is in the form of a ring, is welded to the upper ends of the cage side walls as indicated at 52. The spring plate has a bevelled indicator portion 53 in the region of housing slot 23.

The illustrated construction includes a pair of helical coaxial compression springs 54 and 55. As shown, spring 54 bears against housing bottom wall 11 and spring plate 51 to normally and yieldingly urge the spring plate, cage 46 and U-shaped member 42 upwardly relative to the housing. Spring 55 is positioned in cage 46 and bears against the base of the cage and the housing top wall. Spring 54 is substantially stronger than spring 55. That is to say, these springs have different load-deflection characteristics, spring 54 being deflected to a lesser extent than spring 55 when each spring is subjected to the same load. Spring 54 is adapted to carry the piping load for which the device is designed and also absorb downward shock forces. Spring 55 absorbs upward shock forces. It will be noted that spring 55 becomes effective to absorb upward shock forces before spring 54 becomes completely unloaded.

The hanger is provided with a second coupling means 56 for effecting connection with the piping load that is to be supported. This coupling means includes a tubular rod 57 having a circular flange or head 58. The lower surface of head 58 is rounded as indicated at 59 to obtain a swivel connection between web 43 and rod 57. At least the lower portion of rod 57 is internally threaded to receive the upper portion of a threaded rod 60 that is adapted to be connected to the piping load. Rod 60 is provided with nuts 61 and 62.

U-shaped member 42 carries a stop element 63 that is positioned between arms 44 and is welded thereto as indicated at 64. The stop element projects beyond the side edges of arms 44 and is wider than aperture 13. Element 63 is adapted to bear against the housing bottom wall and serve as a positive stop to limit downward travel of the U-shaped member and parts connected thereto.

From the foregoing, it is thought that the construction, operation, and advantages of the herein described invention will be apparent to those skilled in the art, without further description. It is to be understood, however, that various changes in the size, shape, proportion and minor details of construction may be resorted to without departing from the spirit, or sacrificing any of the invention.

I claim:

In a combined spring hanger and shock absorber for supporting pipes and the like, a housing including top, bottom and side walls, said housing having a window defined at least in part by the side and top walls, said bottom wall having a through aperture, a device positioned in and movable vertically relative to the housing, said device comprising a U-shaped member registering with the aperture in the bottom wall and including a web and a pair of arms, a spring support cage attached to the ends of the arms remote from the web, and a spring plate secured to the cage and projecting laterally therebeyond, a first spring within the housing and bearing against the plate and the housing bottom wall, said spring normally and yieldingly urging the device upwardly relative to the housing, and a second spring carried by the cage and extending thereabove, said second spring being substantially coaxial with the first spring and being at least partly within the confines of the first spring, said second spring being adapted to yieldingly bias the device downwardly relative to the housing against the action of the first spring upon predetermined upward movement of the device, said first spring being substantially stronger than the second spring, said device and springs being accessible through the window.

References Cited in the file of this patent

UNITED STATES PATENTS

| | | |
|---|---|---|
| 1,703,397 | Kirk et al. | Feb. 26, 1929 |
| 2,373,125 | Loepsinger | Apr. 10, 1945 |
| 2,621,005 | Turpin | Dec. 9, 1952 |
| 2,675,977 | Von Berlichingen et al. | Apr. 20, 1954 |
| 2,713,982 | Sherbrooke | July 26, 1955 |